Patented Feb. 15, 1949

2,461,523

UNITED STATES PATENT OFFICE 2,461,523

DEHYDROFLUORINATION OF POLYFLUOROALKANES

Donald Drake Coffman and Richard D. Cramer, Wilmington, Del., assignors to E. I. du Pont de Nemours & Company, Wilmington, Del., a corporation of Delaware No Drawing. Application December 4, 1946, Serial No. 713,924

5 Claims. (Cl. 260—653)

This invention relates to the catalytic dehydrofluorination of polyfluoroalkanes and, more particularly, to the dehydrofluorination of 1,1-difluoroethane to vinyl fluoride.

Heretofore the dehydrofluorination of polyfluoroalkanes to fluoroalkenes has been accomplished by simple pyrolysis and by pyrolysis in the presence of various metals or salts as catalysts (application Ser. No. 633,264, filed December 6, 1945, by Downing, Benning and McHarness; application Ser. No. 633,265, filed December 6, 1945, by Harmon). In general, these methods require high temperatures and/or relatively long contact times, with the result that undesirable side reactions occur with the formation of acetylenic compounds which contaminate the reaction product. In particular, the presence of more than very small amounts of acetylene in vinyl fluoride is undesirable and necessitates either a careful fractionation of the two gases or an expensive scrubbing of the mixture with acetylene absorbents. Furthermore, pyrolysis of polyfluoroalkanes, particularly at relatively long contact times, tends to involve formation of tarry deposits which usually deactivate the catalysts employed. Removal of the tarry or carbonaceous deposite is sometimes impossible and in any event does not always result in reactivation of the catalysts.

An object of the present invention is to provide an improved process of dehydrofluorinating polyfluoroalkanes to fluoroalkenes. Another object is to provide a catalytic dehydrofluorination process wherein the catalyst permits very short contact times, thus minimizing the formation of acetylenic compounds, and wherein the catalyst can be reactivated by removal of tarry or carbonaceous deposits. A still further object is to provide such an improved process of dehydrofluorinating 1,1-difluoroethane to vinyl fluoride. Other objects will be apparent from the description of the invention given hereinafter.

The above objects are accomplished according to the present invention by heating a polyfluoroalkane containing at least two carbon atoms with at least two fluorine atoms attached to one carbon atom and at least one hydrogen atom on an adjacent carbon atom at a temperature of 400–850° C. in contact with chromium trifluoride at a contact time of less than three minutes, and recovering the fluoroalkene formed. Polyfluoroalkanes having from two to four carbon atoms, inclusive, and no substituents other than fluorine, are particularly well adapted to the process of this invention. Preferably, a temperature of 500°– 750° C. is employed with a contact time of less than two seconds.

A convenient method of practicing this invention is to pass the polyfluoroalkane over massive chromium trifluoride contained in a tubular reactor heated at 500–750° C. under substantially atmospheric pressure. The fluoroalkene is recovered by distillation and thereby separated from the hydrogen fluoride formed and from unreacted polyfluoroalkane. In general, there will not be enough acetylenic compounds formed to necessitate their removal, but this can be done if desired by scrubbing the product with a suitable absorbent such as ammoniacal cuprous chloride. Alternatively, the pyrolyzate may be passed through an absorbent for hydrogen fluoride, such as soda-lime, then, if desired, through an absorbent for acetylenic compounds, and the fluoroalkene separated from unreacted polyfluoroalkane by distillation. Suitable apparatus comprises means for continuously metering the polyfluoroalkane, such as a flow-meter or rotameter, a tubular reactor of hydrogen fluoride-resistant material, e. g., Inconel, nickel or platinum, towers for scrubbing the pyrolyzate if desired, and a fractionating column.

Polyfluoroalkanes of suitable quality for the process of the instant invention may be prepared by a number of methods. For example, 1,1-difluoroethane may be prepared by the process disclosed in application Serial No. 633,556, filed December 7, 1945, in the names of Burk, Coffman and Kalb, now U. S. Patent No. 2,425,991, said process comprising reacting acetylene with hydrogen fluoride in the liquid phase in the presence of catalytic amounts of boron trifluoride under substantially anhydrous conditions. Other polyfluoroalkanes may be prepared by replacing chlorine in polychloroalkanes by fluorine by means of such fluorinating agents as hydrogen fluoride, antimony fluoride, and the like.

The following examples, in which all parts are by weight unless otherwise specified, illustrate specific embodiments of the present invention.

Example I

A tubular, platinum-lined reactor of ⅜ inch inside diameter and having a heated zone 7 inches long was packed with chromium trifluoride pellets prepared by pelleting hydrated chromium trifluoride ($CrF_3 \cdot 3H_2O$) with 2% of polytetrafluoroethylene as a binder and firing the pellets at 850° C. in an atmosphere of hydrofluoric acid. 1,1-difluoroethane was passed over this catalyst at 725° C. and at a rate of 16 cc. per second. The linear velocity was about 35 cm. per second, corresponding to a contact time of 0.38 second. The crude pyrolyzate was passed through a tower filled with soda-lime to remove hydrogen fluoride, then scrubbed in a counter-current of silver nitrate solution to determine its acetylene content. The scrubbed gases were condensed in a trap cooled with solid carbon dioxide and acetone, and the condensate was distilled through a precision column. From 487 parts of 1,1-difluoroethane there was obtained 111 parts of vinyl fluoride, corresponding to a conversion of 32.7%. There was recovered 310 parts of 1,1-difluoroethane, indicating a 90% yield of vinyl fluoride based on the 1,1-difluoroethane actually consumed. Analysis of the silver nitrate solution indicated that the product contained 2800 parts per million of acetylene.

When, instead of massive chromium trifluoride, there was used a supported catalyst prepared by impregnating absorbent carbon with a suspension of chromium trifluoride in absolute ethanol and drying at 140° C. for 8 hours under reduced pressure, there was obtained a 28% conversion at 725° C. and 0.44 second contact time. The product contained 3600 parts per million of acetylene.

When 1,1-difluoroethane was pyrolyzed in the same reactor, but without catalyst, at 725° C. and 0.44 second contact time, the conversion to vinyl fluoride was only 3.3% and the product contained 10,000 parts per million of acetylene.

It is advantageous in catalytic gas phase processes to use a high gas velocity, whenever possible, since this results in a higher throughput of the material treated. The advantages of the chromium trifluoride catalyst are realized also at high gas velocity, as shown by the following example.

*Example II*

A tubular Inconel reactor of ⅜ inch inside diameter and having a heated zone 35 inches long was packed with the pelleted anhydrous chromic fluoride catalyst of Example I. The reactor was heated to 600° C. and 1,1-difluoroethane was passed over the catalyst at the rate of 55 cc. per second with a linear velocity of approximately 175 cm./second, corresponding to a contact time of 0.61 second. The pyrolyzate was freed of hydrogen fluoride and acetylene in the manner described in Example I, condensed and distilled. From 576 parts of 1,1-difluoroethane was obtained 95 parts of vinyl fluoride and 422 parts of unchanged material, corresponding to a conversion of 24% and a yield of 88.5%. Analysis of the silver nitrate solution indicated that the product contained 270 parts per million of acetylene. Under the same conditions but at a temperature of 725° C., conversion was much higher (38%) but there was more acetylene in the effluent gas.

In comparison, when 1,1-difluoroethane was pyrolyzed in the same reactor, but in the absence of chromic fluoride, at 680–690° C., gas velocity about 175 cm./second and 0.49 second contact time, the conversion was only 9% and the product contained more than twice the amount of acetylene formed in the presence of the catalyst.

*Example III*

2,2-difluorobutane, which may be prepared as described by Gross et al., J. Am. Chem. Soc. 64, 2287, was passed through a tubular Inconel reactor of 1/16 inch inside diameter having a heated zone 7 inches long at a temperature of 650° C. and a contact time of 0.35 second. The reactor was packed with the pelleted anhydrous chromic fluoride catalyst of Example I. The crude pyrolyzate was passed through soda-lime to absorb hydrogen fluoride and then condensed in a trap cooled with a carbon dioxide/acetone mixture. In order to determine accurately the amount of fluorobutene formed, the reaction mixture was brominated at a temperature of −30° C. and the resulting dibromofluorobutane was separated from the unreacted difluorobutane by rectification. There was obtained, in addition to 90 parts of unreacted 2,2-difluorobutane, 36 parts of dibromofluorobutane, corresponding to a conversion of difluorobutane to monofluorobutene of 12.7% and a yield of 60%. When the same reactor, but without catalyst, was used at the same temperature and contact time, the conversion to fluorobutene was only 4%.

The ready and convenient reactivation of the chromium trifluoride catalyst after its activity has been impaired by deposition thereon of tarry or carbonaceous materials is illustrated by the following example.

*Example IV*

Using the reactor and catalyst of Example II and the same high gas velocity (about 175 cm./second) a series of three runs was made starting with fresh catalyst which was not changed or cleaned between the runs. In these three runs, 1,1-difluoroethane was passed over the catalyst at temperatures of 500, 550 and 550° C., respectively, at contact times of 0.62, 0.64, and 0.66 second, respectively. The conversions to vinyl fluoride in the three consecutive runs were 14%, 7%, and 5%, respectively, and the acetylene contents of the product were 250, 480, and 500 parts per million, respectively, showing that the catalyst was increasingly deteriorating as its contamination with tarry deposits increased. At the end of the third run, the cataylst was heated at 550° C. in a stream of oxygen which was passed through the reactor for two hours. 1,1-difluoroethane was then passed through at the same gas velocity, at a temperature of 550° C. and a contact time of 0.56 second. The conversion to vinyl fluoride was 17% and the gas contained only 300 parts per million of acetylene.

It will be understood that the examples set forth hereinbefore are merely illustrative and that the present invention broadly comprises heating a polyfluoroalkane containing at least two carbon atoms with at least two fluorine atoms attached to one carbon atom and at least one hydrogen atom on an adjacent carbon atom at a temperature of 400–850° C. in the presence of chromium trifluoride. Examples of other suitable polyfluoroalkanes are 1,1,1-trifluoroethane 2,2-difluoropropane, and 1,1-difluorobutane. Polyfluoroalkanes containing two to four carbon atoms inclusive, and having no substituents other than fluorine have been found to be especially well adapted to this invention.

While massive chromium trifluoride is the preferred catalyst, chromium trifluoride supported on activated carbon or on other materials inert to hydrogen fluoride is also highly efficient. Instead of chromium fluoride there may be used, although somewhat less efficiently, chromic oxide or hydroxide, which are believed to be converted at least in part to chromium fluoride in the reaction zone under the influence of the hydrogen fluoride formed on pyrolysis of the polyfluoroalkane. Chromium metal also may be used as a catalyst but it is not as desirable as chromium trifluoride from the standpoint of conversion and acetylene formation.

Although the catalytic dehydrofluorination of polyfluoralkanes can be accomplished according to this invention at temperatures between 400° C. and 850° C., a reaction temperature between about 500° C. and about 750° C. is preferred. Below 500° C., the conversion to fluoroalkenes is apt to be low, while above 750° C. side reactions, especially those conducive to acetylene formation, tend to be excessive.

As has been shown, the chromium trifluoride catalysts permit the use of very low contact times. Low contact times are important not only because the purity of the product is thereby increased but also for economic reasons. The preferred contact time (which, of course, depends somewhat on the size of the reactor) is between 0.25 and 2 seconds, more preferably still between 0.25 and 1 second. However, much shorter or much longer contact times, varying between 0.02 and 180 seconds, may be used if desired, depending on other reaction conditions and on the material being treated.

All contact times given herein are calculated with the gas volume taken at standard temperature and pressure conditions, i. e., 0° C. and 760 mm., and with the volume of the reactor corrected for the volume of catalyst contained therein.

The pressure conditions of the reaction may be varied over a wide range. Pressures of between about 0.1 and 100 atmospheres are suitable. However, atmospheric and subatmospheric pressures are preferred because the extent of conversion of polyfluoroalkenes increases somewhat as the pressure under which pyrolysis is effected, decreases. Atmospheric pressure is preferred for economic reasons but excellent results are obtained at pressures near 0.5 atmosphere.

The linear gas velocity of the polyfluoroalkane undergoing pyrolysis can be varied within wide limits. In general, any gas velocity above about 0.05 meter/second is suitable, provided the contact time limits which have been set forth hereinbefore are not exceeded. It is advantageous to use as high a gas velocity as possible. Good results are obtained with gas velocities which, while high, are still in the viscous flow region, i.e., in systems where the Reynolds number, a factor which depends on the diameter of the tube, the linear velocity, the density and the viscosity of the gas (Dodge and Thompson, "Fluid Mechanics," chapters VIII and IX), is below about 2100. This is the case for the examples given above. Desirably, the Reynolds number at the operating temperature is above about 300. However, particularly in large scale operations involving reactors of considerable size, it is desirable to use a sufficiently high linear velocity so that the nature of the flow is turbulent rather than viscous, i. e., the Reynolds number is above about 4000. Under turbulent flow conditions the polyfluoroalkane is heated more uniformly and higher conversions to the desired fluoroalkene with less formation of by-products may be obtained.

In addition to the advantages of good conversions and low acetylene production at moderate temperatures, the chromic fluoride catalyst has the advantage of ready reactivation, which permits use for long periods without replacement. Reactivation (i. e., removal of deposits) is most conveniently carried out by heating the catalyst at temperatures between about 500 and about 850° C. in a stream of air or oxygen.

The fluoroalkenes produced by the process of this invention are useful as intermediates in the synthesis of fluorohydrocarbons. Members of this class of organic materials may be polymerized or copolymerized to form valuable plastics or resins. A particularly valuable fluoroalkene is vinyl fluoride, from which polymers of excellent physical properties and unusual chemical inertness may be prepared.

As many apparently widely different embodiments of this invention may be made without departing from the spirit and scope thereof, it is to be understood that the invention is not limited to the specific embodiments thereof except as defined in the appended claims.

We claim:

1. Process of dehydrofluorinating a polyfluoroalkane containing 2–4 carbon atoms, inclusive, with at least 2 fluorine atoms attached to 1 carbon atom and having no substituents other than fluorine, which comprises heating said polyfluoroalkane at a temperature of 400° C.–850° C. in the presence of chromium trifluoride.

2. Process of dehydrofluorinating a polyfluoroalkane containing 2–4 carbon atoms, inclusive, with at least 2 fluorine atoms attached to 1 carbon atom and having no substituents other than fluorine, which comprises heating said polyfluoroalkane at a temperature of 500° C.–750° C. in the presence of chromium trifluoride.

3. Process of dehydrofluorinating 1,1-difluoroethane which comprises heating said 1,1-difluoroethane at a temperature of 400° C.–850° C. in the presence of chromium trifluoride.

4. Process of dehydrofluorinating 1,1-difluoroethane which comprises heating said 1,1-difluoroethane at a temperature of 500° C.–750° C. in the presence of chromium trifluoride.

5. Process of dehydrofluorinating 2,2-difluorobutane which comprises heating said 2,2-difluorobutane at a temperature of 500° C.–750° C. in the presence of chromium trifluoride.

DONALD DRAKE COFFMAN.
RICHARD D. CRAMER.

REFERENCES CITED

The following references are of record in the file of this patent:

UNITED STATES PATENTS

| Number | Name | Date |
| --- | --- | --- |
| 2,183,574 | Levine et al. | Dec. 19, 1939 |
| 2,407,129 | Benning et al. | Sept. 3, 1946 |
| 2,413,695 | Downing et al. | Jan. 7, 1947 |

OTHER REFERENCES

Torkington et al., Trans. Faraday Soc., Vol. 41, 236–7 (1945).